United States Patent [19]

Greschner et al.

[11] Patent Number: 5,283,437
[45] Date of Patent: Feb. 1, 1994

[54] PNEUMATICALLY AND ELECTROSTATICALLY DRIVEN SCANNING TUNNELING MICROSCOPE

[75] Inventors: Johann Greschner, Pliezhausen; Martin Nonnenmacher, Schonaich; Olaf Wolter, Aidlingen, all of Fed. Rep. of Germany

[73] Assignee: International Business Machines Corporation, Armonk, N.Y.

[21] Appl. No.: 20,008

[22] Filed: Feb. 17, 1993

Related U.S. Application Data

[63] Continuation of Ser. No. 811,635, Dec. 23, 1991, abandoned.

[30] Foreign Application Priority Data

Dec. 21, 1990 [EP] European Pat. Off. ......... 90125214.8

[51] Int. Cl.[5] .............................................. H01J 37/26
[52] U.S. Cl. ..................................... 250/306; 369/126
[58] Field of Search ............... 250/306, 307; 369/126; 365/151

[56] References Cited

U.S. PATENT DOCUMENTS 4,912,822 4/1990 Zdeblick et al. ................ 29/25.35
4,916,002 4/1990 Carver ............................. 428/139

FOREIGN PATENT DOCUMENTS 0194323 9/1986 European Pat. Off. ..... G01N 27/00
0383182 8/1990 European Pat. Off. ..... G01N 27/00
3929735 10/1990 Fed. Rep. of Germany .......... H01J 37/28

OTHER PUBLICATIONS

Stylus for an Atomic Force Microscope, IBM Technical Disclosure Bulletin, vol. 32, No. 5A, pp. 10-12, Oct. 1989.

Primary Examiner—Jack I. Berman
Attorney, Agent, or Firm—J. D. Ellett, Jr.; Robert M. Trepp

[57] ABSTRACT

A scanning tunneling microscope is disclosed with the probe tip formed as an integral part of a membrane. A counter-electrode is formed on the membrane and four electrodes are provided spaced apart from the counter-electrode. The tip is scanned by means of these electrodes. Coarse positioning of the tip along the Z axis is done by applying pressure or vacuum to the membrane. Also disclosed is the method of making the scanning tunneling microscope.

20 Claims, 3 Drawing Sheets

PNEUMATICALLY AND ELECTROSTATICALLY DRIVEN SCANNING TUNNELING MICROSCOPE

This application is a continuation of application Ser. No. 07/811,635, filed Dec. 23, 1991, now abandoned.

FIELD OF THE INVENTION

The subject invention relates generally to scanning tunneling microscopy and more particularly to a pneumatically and electrostatically driven scanning tunneling microscope.

BACKGROUND ART

In a scanning tunneling microscope ("STM") an electrically conductive microscope tip is moved in a scanning fashion over the surface of a sample. A pointed end of the microscope tip moves in close proximity to the surface, typically within the space of the diameters of several atoms (approximately within 0.5 nm). Because of the close proximity of the tip to the surface, the probability density function of electrons for atoms in the tip overlaps in space the probability density function of electrons for atoms on the surface. The surface of the sample over which the conductive microscope tip moves is also electrically conductive. Under these conditions, a tunneling current can flow between the microscope tip and the surface, if a suitable bias voltage between these two conductor's is applied. Typically, for a tip-to-sample spacing of a few nm, 100 millivolts of bias voltage will provide on the order of 1 nanoampere of current.

Scanning tunneling microscopes were first built by Binnig and Rohrer (IBM J. RES. DEVELOP., VOL. 30, NO. 4, JULY 1986, pp. 355-369, G. Binnig and H. Rohrer, "SCANNING TUNNELING MICROSCOPY", and IBM TECHNICAL DISCLOSURE BULLETIN, VOL. 27, NO. 10B, MARCH 1985, pp. 5976-5977, G. Binnig et al. "FAST SCAN PIEZO DRIVE"). The scanning tunneling microscope described in the cited publications used a piezoelectric tripod to support and move the microscope tip. This tripod consisted of three rods of piezoelectric material joined at a junction; each rod piezoelectrically expanded and contracted along one of three Cartesian coordinate axes. The microscope tip was mounted at the junction of the three rods. The tip was brought into proximity of the surface by a rough positioner. Thereafter, the piezoelectric rods of the tripod were used to scan the microscope tip across the surface to develop an image of that surface.

U.S. Pat. No. 4,912,822 granted Apr. 3, 1990 based on application Ser. No. 348,707 which is a division of application Ser. No. 149,236 ("the '822 patent")—disclosed a method of making an integrated scanning tunneling microscope. The '822 patent described an integrated tunneling microscope and an integrated piezoelectric transducer and methods for making both. The integrated tunneling microscope included one- or two-arm piezoelectric bimorph cantilevers formed by micromachining using standard integrated circuit processing steps. These cantilevers were attached to the substrate at one area and were free to move under the influence of piezoelectric forces. The piezoelectric forces were caused by the application of appropriate control voltages generated by control circuitry and applied to pairs of electrodes formed as an integral part of the bimorph cantilever structure. The electric fields caused by the control voltages caused the piezoelectric bimorphs to move in any desired fashion within ranges determined by the design. The bimorph cantilevers had tips with sharp points formed thereon by evaporation deposition of a conductive material through a shadow mask. The tips were moved by the action of the control circuitry and the piezoelectric bimorphs so as to stay within a small distance of a conducting surface. However, conventional scanning tunneling microscopes controlled by piezoelectric materials generally have a disadvantage of exhibiting a hysteresis effect which is not ideal for a high absolute accuracy.

European Patent Specification No. 0 194 323, published Aug. 2, 1989 based on European Patent Application No. 85102554.4 filed Mar. 7, 1985, ("the '323 published application") disclosed an integrated form of a scanning tunneling microscope where all movements in the X, Y and Z direction were under the control of electrostatic forces. The '323 published application described a scanning tunneling microscope integrated on a semiconductor chip into which slots were etched to form a center portion linked by a first pair of strips to an intermediate portion. The intermediate portion in turn was linked by a second pair of strips to the main body of the chip. The slots were etched to have mutually orthogonal directions to allow the center portion to perform movements in the X and Y direction under the control of electrostatic forces created between the strips defined by the slots and their opposite walls. A protruding tip was formed on the center portion which was capable of being moved in the Z direction by meal-is of electrostatic forces. The integrated scanning tunneling microscope of the '323 published application was fabricated in such a way that the X, Y and Z movements were not decoupled from each other. Such coupling of the X, Y and Z movements can complicate the control of the tip movement and can detract from the accuracy of tip positioning. Moreover, it would appear to be difficult to fabricate successfully the integrated scanning tunneling microscope described in the '323 published application from a single piece of material.

Thus, a need has arisen for a scanning tunneling microscope head which can be easily fabricated using standard semiconductor integrated circuit fabrication processes and which permits accurate positioning of the microscope tip.

SUMMARY OF THE INVENTION

We have invented a pneumatically and electrostatically driven scanning tunneling microscope and a method for fabricating a scanning tunneling microscope sensor head which avoid problems of the prior art noted above.

The scanning tunneling microscope of the invention is adapted to produce an STM image of a sample having a surface which is at least sufficiently electrically conductive to enable an electron tunneling current to pass between the surface and the microscope. A scanning coordinate plane is defined to be generally parallel to the surface of the sample, with an X-axis direction and a Y-axis direction defined to be perpendicular to one another and to lie in the scanning coordinate plane. A direction oriented perpendicular to the scanning coordinate plane defines a Z-axis direction.

The scanning tunneling microscope of the invention comprises a scanning-tunneling-microscope sensor head which includes at least one tunneling-current microscope tip having an electron-emitting tip point at one end and a pneumatic/electrostatic tip micropositioner to which the tunneling-current microscope tip is connected. The tip micropositioner is capable of controllably positioning the tip point relative to the sample surface within a scanning/offset volume which extends over distance ranges in the X, Y, and Z directions. The tip micropositioner includes a sensor-head body and a deflectable tip-positioner membrane connected along an outer perimeter to the sensor-head body. The tunneling-current microscope tip is integrally connected to a deflectable portion of the tip-positioner membrane.

The tip micropositioner includes a counterelectrode connected to the tip-positioner membrane. The counterelectrode is electrically insulated from the tip point and preferably is shaped and positioned generally symmetrically relative to the microscope tip.

The tip micropositioner also includes a plurality of drive electrodes—most preferably four—connected to the sensor-head body. The drive electrodes are electrically insulated from one another, from the counterelectrode, and from the tip point. The drive electrodes are spaced apart from the counterelectrode and preferably are arranged generally symmetrically relative to the microscope tip.

The sensor-head body is shaped to cooperate with the tip-positioner membrane to define a gas-tight pneumatic membrane-deflection plenum in the interior of the body with the membrane forming a wall of the plenum. An opening passing through the sensor-head body defines a sensor-head gas port through which a membrane-deflection gas may be introduced and withdrawn from the pneumatic membrane-deflection plenum.

Application of suitable voltages between respective ones of the drive electrodes and the counterelectrode generates electrostatic forces between the drive electrodes and -the counterelectrode which permits the tip-positioner membrane to which the counterelectrode is attached to be electrically controllably deflected and thereby permits the tip point of the microscope tip connected to the membrane to be electrically controllably positioned. The drive electrodes, counterelectrode, and microscope tip are located relative to one another so as to permit the tip point to be electrically controllably positioned in an electrically-controllable-positioning volume which extends over distance ranges in the X, Y, and Z directions.

Controlling the pressure of a membrane-deflection gas in the pneumatic membrane-deflection plenum relative to the ambient pressure surrounding the sensor head permits the tip-positioner membrane which forms a wall of the plenum to be pneumatically controllably deflected and thereby permits the tip point of the microscope tip connected to the membrane to be pneumatically controllably positioned.

The scanning tunneling microscope of the invention includes a pneumatic membrane-deflection gas-pressure control unit connected to the gas port of the scanning tunneling microscope sensor head for introducing a membrane-deflection gas into the pneumatic membrane-deflection plenum at an adjustably controlled pressure. Nitrogen, argon and helium are preferred membrane-deflection gases because of their chemical inertness. Air may be suitable as a membrane-deflection gas for some applications.

The scanning tunneling microscope of the invention also includes an X-Y drive circuit connected to the drive electrodes and the counterelectrode of the sensor head for generating voltages to scan the tip point of the tunneling-current microscope tip in a matrix fashion across the sample surface.

The scanning tunneling microscope of the invention also includes a Z-axis position control circuit connected to drive and counter electrodes of the sensor head and to the tunneling-current microscope tip to control the distance of the point of the microscope tip from the sample surface in substantially the Z direction responsive to tunneling currents from the tip.

The scanning tunneling microscope of the invention also includes an STM image generator connected to the X-Y drive circuit and to the Z-axis position control circuit for generating an STM image of the surface scanned by the tunneling-current microscope tip from Z-axis position control signals produced by the Z-axis position control circuit as related to X-Y drive position signals generated by the X-Y drive circuit.

A preferred embodiment of the sensor-head body of the scanning-tunneling-microscope sensor head of the invention includes a membrane support frame and a gas-port cap. The membrane support frame is shaped to support the deflectable tip-positioner membrane under tensile stress with the membrane being connected to the support frame along an outer perimeter. The gas-port cap and the membrane support frame are shaped and dimensioned to be joined together in a face-to-face relationship with the membrane supported on the frame extending between the frame and the cap. The gas-port cap and the membrane support frame are shaped such that when the cap arid frame are so joined together, the pneumatic membrane-deflection plenum of the sensor head is defined between a face of the cap and the membrane. Preferably, the drive electrodes of the sensor head are mounted on the face of the gas-port cap which faces the membrane-deflection plenum. The gas-port cap of the preferred embodiment of the scanning-tunneling-microscope sensor head has one or more passageways extending through it to provide gas communication with the plenum.

Preferably, the passageways extending through the gas-port cap of the preferred scanning-tunneling-microscope sensor head of the invention are dimensioned to interact hydrodynamically with membrane-deflection gas flowing in the passageways to provide damping for the deflectable membrane.

Preferably, the membrane support frame is fabricated from silicon. The gas-port cap is preferably made of glass. Preferred materials for the tip-positioner membrane include silicon carbide and silicon nitride. The tunneling-current microscope tip is preferably integrally joined to the tip-positioner membrane.

As noted above, the drive electrodes of the scanning-tunneling-microscope sensor head of the invention are preferably arranged generally symmetrically relative to the tunneling-current microscope tip. It is particularly preferred to employ four drive electrodes located at essentially ninety-degree angular intervals about an axis defined by the microscope tip. Preferably, each such drive electrode is shaped generally as a quarter disk.

One preferred method of the invention for making a scanning-tunneling-microscope sensor head using pneumatic and electrostatic control of tip motion comprises the step of depositing masking layers on opposing sides of a semiconductor substrate. A shallow pit preferably several $\mu m$ in depth is etched through a front-side masking layer and into the substrate. The lateral dimensions of the pit correspond to the size desired for a tip-positioner membrane of the sensor head.

The method further comprises the step of removing the front-side masking layer and depositing a resistent masking layer on the shallow pit.

The method of the invention further comprises the steps of providing an opening in the masking layer in the center of the shallow pit and etching a deep hole substantially through the substrate.

The remaining masking layer is then removed and the front side of substrate including the deep hole is covered with a tensile-stressed film.

A back side masking layer is then opened and the substrate thinned down to form a substrate frame with the tensile-stressed film which is to form the membrane and tip exposed. A metal layer is then applied to the tensile stressed film on the front side and patterning to form a first electrode which extends over the area corresponding to the shallow pit.

The method also includes the step of applying a metal layer to a cap and patterning the metal layer to form a plurality of second electrodes.

The method further includes the step of bonding the cap bearing the second electrodes to the substrate frame with the second electrodes being positioned in a spaced apart relationship from the first electrode on the membrane. The remaining mask is removed from the back side of substrate and the substrate frame thinned by etching. A metal coating is applied to the tip and a part of substrate for carrying tunneling currents.

A second preferred method for making a scanning-tunneling-microscope sensor head using pneumatic and electrostatic control of tip motion, comprises the step of applying a metal layer to substrate and patterning the metal layer to form a plurality of first electrodes. A dielectric layer is then applied to the surface of the first electrodes overlapping the electrodes.

A metal layer is applied to the dielectric layer and patterned to form an annular conductor which covers approximately the same area as first electrodes and forms a second electrode. A dielectric layer is then deposited on top of the second electrode to form a generally circular sandwich of electrodes and dielectric layers.

An opening is then provided substantially in the center of the circular sandwich of electrodes and dielectric layers and a hole is through the substrate. The hole serves as a mold for the subsequent formation of a tunneling-current microscope tip.

The circular sandwich including the hole is then covered with a tunnel-contact material. A dielectric layer is then applied to the tunnel-contact material layer and to the entire structure.

The method further includes the step of removing the substrate material surrounding the microscope tip by etching using a structured oxide mask. The substrate is then thinned by etching. The dielectric layer is etched off so as to provide clearance space for the generally circular sandwich comprising the membrane, the tunnel contact layer with tip as an integral part of the layers, the dielectric layer, and the annular conductor, for moving along X, Y, and Z-axes upon application of appropriate electrical fields.

Preferred embodiments of the scanning tunneling microscope of the invention can exhibit an essentially hysteresis-free drive in the X, Y, and Z directions.

Preferred embodiments of the scanning-tunneling-microscope sensor heads of the invention can have high mechanical and thermal stability as a result of low mass and small dimensions. Consequently, such a preferred sensor head exhibits a low susceptibility to external vibrations, which is a substantial advantage.

If desired, control circuitry for a current supply for the distance control of the tip may be integrated on the same semiconductor substrate as used in fabricating the sensor-head body. Furthermore, signals resulting from scanning may be processed in the immediate vicinity of the sensor head by circuits integrated on the same substrate, if desired, which may reduce undesirable interference to the signals.

BRIEF DESCRIPTION OF THE DRAWINGS

The invention will be described in detail below with reference to the following drawings.

BEST AND VARIOUS MODES FOR CARRYING OUT THE INVENTION

Figure 1:
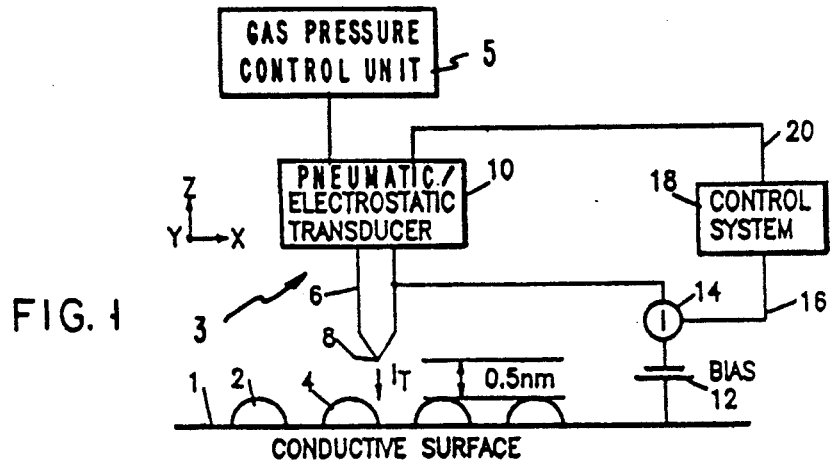
FIG. 1 is a simplified schematic diagram of a pneumatically and electrostatically driven scanning tunneling microscope.

The schematic diagram of FIG. 1 depicts a scanning tunneling microscope (3). In FIG. 1, a sample to be examined has a conductive surface (1) which has topographical features (2) and (4). An X-Y coordinate plane is defined to be substantially parallel to the conductive surface (1). A Z coordinate direction is defined to be perpendicular to the X-Y coordinate plane.

The scanning tunneling microscope (3) includes a conductive tip (6) for scanning the surface (1). The conductive tip is very narrow at its point (8), and preferably terminates in a single atom at the point (8). A bias voltage can be applied between the conductive tip (6) and the conductive surface (1) by a bias source (12).

The scanning electron microscope (3) includes a pneumatic/electrostatic transducer (10) which serves as a tip micropositioner and is adapted to scan the point (8) over the conductive surface (1) in a raster scan pattern. The raster scan pattern is defined by a plurality of raster scan lines in an X-Y scanning plane which extends substantially parallel to the X-Y coordinate plane. The transducer (10) is also adapted to move the tip up and down along a Z axis defined to be substantially perpendicular to the X-Y scanning plane, pneumatically—for coarse positioning—and electrostatically—for fine positioning. The tip (6) can be moved along the Z axis as the tip is scanned in the X-Y plane so as to maintain an approximately a relatively constant distance between the tip point (8) and the uppermost portion of the topographical feature over which the tip is scanned. A bias voltage can be applied between the conductive tip (6) and the conductive surface (1) by a bias voltage source (12).

The distance between the tip point (8) and the uppermost regions of the topological feature (4) over which the tip is scanning is usually around 0.1 to 1 nm. Such a distance places the tip point (8) within an overlap region in which the probability density functions of the electrons for the atoms in the uppermost regions of the topographical feature (4) over which the tip scanning overlap the probability density functions of the electrons for the atoms of the tip. As long as the distance between the tip (6) and the surface (1) is within the overlap region and a bias voltage is applied between the tip (6) and the surface (1), a tunneling current—which is symbolized by the arrow $I_T$ in FIG. 1.—will flow between the tip point (8) an(a the conductive surface (1). The magnitude of the tunneling current IT is generally exponentially related to the distance between the tip (6) and the surface (1).

The scanning tunneling microscope (3) includes a current sensor (14) which can sense the magnitude of the tunneling current $I_T$ and output a feedback signal on a feedback line (16) which is substantially proportional to the magnitude of the tunneling current. The scanning tunneling microscope (3) also includes a feedback circuit control system (18) which is adapted to receive the feedback signal and generate suitable electrostatic transducer driving signals on a drive-signal bus (20) to cause the electrostatic transducer (10) to move the tip (6) in such a manner that the tunneling current $I_T$ is maintained at a substantially constant value. The control system (18) is also adapted to generate suitable electrostatic transducer driving signals on drive-signal bus (20) to cause the tip (6) to be raster scanned across the conductive surface (1).

The scanning tunneling microscope (3) includes a gas pressure control unit (5) connected to the pneumatic-/electrostatic transducer (10) for supplying nitrogen or other pneumatic transducer drive gas to the transducer (10) at a controlled adjustable pressure for coarse positioning of the tip in the Z axis direction.

Figure 2:
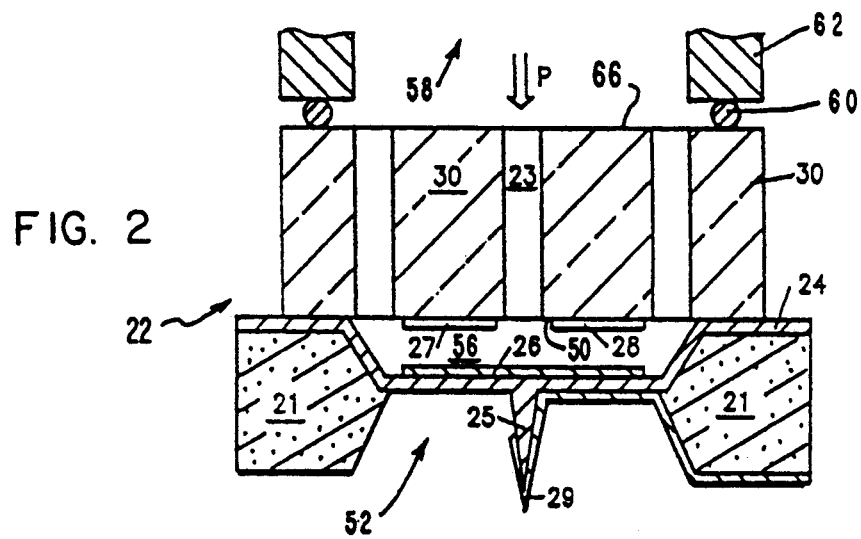
FIG. 2 is a cross sectional view of a preferred embodiment of a scanning-tunneling-microscope sensor head according to the present invention.

FIG. 2 shows mechanical details of a preferred scanning-tunneling-microscope sensor head (22) according to the invention. The scanning-tunneling-microscope sensor head (22) is suitable for the electrostatic deflection in the X, Y and Z coordinate directions as previously defined. The sensor head (22) includes a glass block (30) and a generally square silicon frame (21) mounted adjacent to an electrode-support face (50) of the glass block 30. A generally square-shaped central opening (52) passes through the silicon frame (21). A thin membrane (24) extends across the central opening (52) in the silicon frame (21) at an axially intermediate position in the opening spaced apart from the electrode-support face (50) of the glass block (30). A space between the membrane (24) and the electrode-support surface of the glass block (30) defines a membrane-deflection plenum (56). The membrane deflection plenum (56) is several μm thick in the axial direction.

Projecting from the center of the membrane (24) is a scanning-tunneling-microscope tip (25). A metallic coating (29) coats the tip (25) and a part of the silicon frame (21) to provide a conductive path for tunneling currents. A preferred coating for this purpose is a platinum coating with a thickness of about 0.1 μm. The membrane is intimately fixed to glass block (30) by the silicon frame (21) to seal the plenum (56) in a gas-tight fashion.

Two pairs of metallic electrodes X1 (27), X2 (27'), Y1 (28), Y2 (28') are arranged substantially symmetrically on the electrode-support face (50) of the glass block (30). The thickness of the electrodes is preferably in the range of from about 0.1 to 1 μm. Most preferably, the electrodes are about 1 μm thick. As shown schematically in FIG. 3, electrode leads (64) extend along the electrode-support face (50) of the glass block (30) and through the gas-tight junction between the glass block (30) and the membrane (24) to provide circuit connections to the electrodes (27, 27', 28, 28'). A thin metallic coating forms a Z electrode (26) on a surface of the membrane (24) which faces the membrane deflection plenum (56). A Z-electrode lead (not shown) extends from the Z electrode (26) along the surface of the membrane (24) which faces the glass block (30) and through the gas-tight junction between the glass block (30) and the membrane (24) to provide a circuit connection to the electrode.

Figure 3:
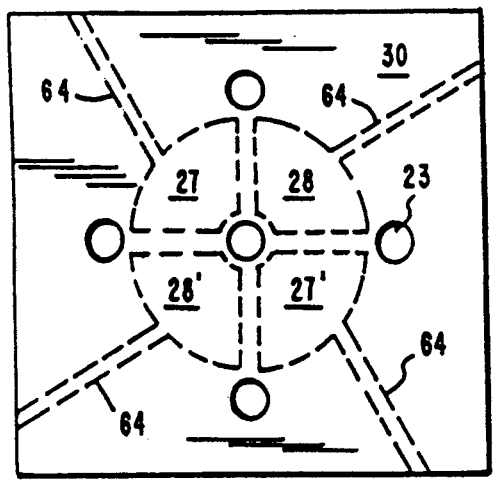
FIG. 3 is a top plan view of an upper part of the embodiment of FIG. 2.
Figure 4:
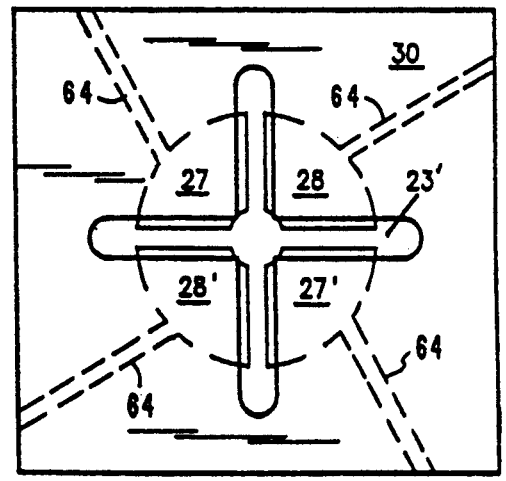
FIG. 4 is a top plan view of an upper part of an alternative preferred embodiment of a scanning-tunneling-microscope sensor head of the invention.

The glass block (30) is preferably several mm thick. The glass block (30) is provided with bores (23) which extend from the electrode-support face (50) through the glass block (30) to an opposing face (66), as shown in FIGS. 2 and 3. Alternatively, the bores (23) may have the form of slots, as shown in the top plan view of FIG. 4. The bores (23) provide communication to the plenum (56).

The scanning tunneling microscope includes a gas pressure control unit (5) having a pressure-control chamber (not shown) which can contain nitrogen or other gas at a selectably variable, controlled pressure. The pressure-control chamber has a pressure-control port (58) which communicates with the pressure-control chamber. The pressure-control port (58) has a pressure-control-port rim (62) which forms a gas-tight seal with a gas-communication face (66) of the glass block (30) by way of a gasket (60). The membrane-deflection plenum (56) communicates with the pressure-control chamber of the pressure-control unit (5) by way of the bores (23) passing through the glass block (30) and the pressure-control port (58).

A change in the gas pressure in the membrane deflection-plenum (56) causes the membrane (24) to deflect. A coarse positioning of the tip (25) in the z direction can be achieved by varying the gas pressure in the pressure-control chamber of the pressure control unit (5) and thereby varying the degree of deflection of the membrane (24). The pressure-control chamber can be a vacuum chamber creating a pressure below the ambient pressure, which tends to move the membrane with the tip towards the glass block, or a positive-pressure chamber, creating a pressure greater than the ambient pressure, which tends to move the membrane with the tip away from the glass block (30). The embodiment of the scanning-tunneling-microscope sensor head in accordance with FIGS. 5A to 5G discussed below would preferably use a pressure $\leq = 1$ atm, whereas the embodiment of the scanning-tunneling-microscope sensor head in accordance with FIGS. 6A to 6E would preferably use a pressure $\geq = 1$ atm. After positioning the tip over a desired region of the sample to be studied a coarse approach of the tip in Z direction is used. For coarsely moving the tip in Z direction, the pressure applied by the pressure control unit (5) to membrane (24) through the bores or slots (23) in glass block (30) is varied. During this step the tip (25) which forms an integral part of membrane (24) is approached to the sample to be studied within several μm.

There are a number of technical requirements for the membrane/tip assembly which include the membrane stress and the eigenfrequency $f_o$ of the membrane. The membrane stiffness is neglectable for thin membranes. Stress and $f_o$ can be varied as required by subjecting the membrane to pressure when coarsely moving the tip to the substrate by varying the gas pressure as previously described. Typical values for the stress are $T=10$ N/mm$^2$ and for the eigenfrequency $f_o \geq =10$ kHz.

In addition, during the scanning operation the membrane's damping can be specifically controlled as a function of the geometry of the environment, for example, as a function of the number of bores in glass block (30) and the diameter of of the bores (23). Bores (23) preferably having a diameter of about 500 $\mu$m can interact hydrodynamically with the flow of the pneumatic transducer drive gas in the bores and provide a damping of the membrane (24).

In operation, during a coarse approach, the entire scanning microscope (including the tip) is advanced to within several $\mu$m of the sample surface to be studied. Conventional interferometric optical control means may be used to monitor the coarse approach. In a preliminary nonscanning positioning step, a maximum voltage of, say, $U_z=200$ V can be applied between the X-Y electrodes (27, 27', 28, 28') on glass block (30) and the Z electrode (26) on membrane (24). Then, for a fine approach, the electrode voltage $U_z$ can be reduced until it is detected that the tip (25) is in a tunnel mode. For example, the tunnel mode might be detected at $U_z=100$ V. The distance between tip and sample is controlled as a function of the $U_z$-voltage. For tip scanning, voltages $U_{x1}$, $U_{x2}$, $U_{y1}$, and $U_{y2}$, applied, respectively, to the X1 (27), X2 (27'), Y1 (28), and Y2 (28') electrodes, are used. Scanning in an X-direction is carried out by increasing voltage $U_{x1}$ and decreasing voltage $U_{x2}$. This leads to a slight rotary movement of the membrane (24) and thus to a scanning movement of the tip (25, 29). Scanning in the Y-direction is carried out analogously with voltages $U_{y1}$ and $U_{y2}$. The exact voltage curves of $U_{x1}$, $U_{x2}$ and $U_{y1}$, $U_{y2}$ respectively, which yield an effectively linear tip scan, have to be determined in a matrix test. It is pointed out that $U_x$ appears as a square value in the matrix.

The maximum X-Y scanning area is primarily dependent on the geometry of the sensor head (e.g. membrane size and length of the tip). If, for example, the tip length 1 is half the membrane side length a, then the maximum X-deflection substantially equals the Z-deflection.

The following calculation shows that both the mechanical and the electrical parameters of the scanning tunneling microscope are realizable. The membrane is taken to have a tensile stress T of about 10 N/mm$^2$. The membrane is taken to be square shaped with a side length designated "a."

The flexural wave rate is $$c_M = \sqrt{\frac{T}{\rho}}.$$

The resonance frequency is $$f_{res} = \frac{c_M}{2a}(n).$$

The resonance frequency is for a membrane thickness $d=2$ $\mu$m and a membrane side length $a=2$ mm $$f_{res} = 20 \text{ kHz}.$$

For a membrane thickness $d=1$ $\mu$m and a membrane side length $a=10$mm there is still a resonance frequency $$f_{res} = 4 \text{ kHz}.$$

In that case, the maximum deflection $\Delta d$ at a surface load q is $$\Delta d = \frac{8q \cdot a^2}{\pi^4 \cdot T \cdot d}.$$

The force exerted on the membrane when a voltage U is applied leads to a maximum deflection (q=electrostatic force in the plate capacitor)

$$\Delta d = \frac{4\epsilon_o \cdot U^2 \cdot a^2}{T \cdot \pi^4 \cdot d \cdot e^2}$$

where e is the distance between the capacitor plates.

EXAMPLE 1

$e=5$ $\mu$m
$U=\pm 100$ V
$a=2$ mm$\rightarrow \Delta d=2.6$ $\mu$m
$T=10$ N/mm$^2$
$d=2$ $\mu$m.

For pneumatically deflecting the membrane by about 1.3 $\mu$m a pressure of about 80 Pa would be necessary.

EXAMPLE 2

$e=20$ $\mu$m
$a=10$ mm$\rightarrow \Delta d=8$ $\mu$m
$d=1\mu$m
otherwise identical to Example 1.

Neglecting the plate stiffness (i. e. only the tensile stress of the membrane is considered: this holds for thinner membranes).

$d \approx$ constant.

The calculations were based on maximum voltages of about 200 V. The electrode spacing was 5 $\mu$m and 20 $\mu$m, respectively. If the scanning tunneling microscope is used at normal air pressure, it has to be determined whether a voltage breakdown is taking place. The breakdown strength in a conventional electric actuator with an air gap is limited to approximately $3 \times 10^6$ V/m by the electrical breakdown of air. For 200 V and a 10 gm gap, a breakdown strength of $2 \times 10^7$ V/M is already obtained.

The value of $3 \times 10^6$ V/m no longer applies but begins to increase as the gap separation approaches a critical value. In this conjunction, see S. F. Bart et al. in *Sensors and Actuators*, 14 (1988) pp 269-292. For a gap of 12.5 $\mu$m, the value given is $3.2 \times 10^7$ V/M. Other values in this article proceed from a maximum of $3 \times 10^8$ V/M (p 273). These higher values indicate that a scanning tunneling microscope in accordance with the invention should not experience voltage breakdown under normal operating conditions.

Figure 5A:
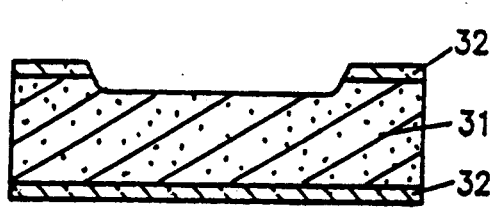
FIGS. 5A to 5G are cross sectional views of stages in a first preferred process of fabrication of a preferred structure for a scanning-tunneling-microscope sensor head according to the present invention.
Figure 5B:
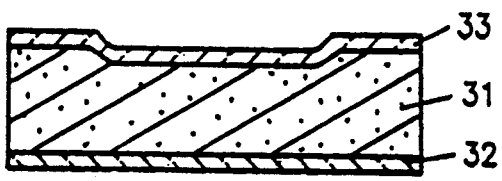
Figure 5C:
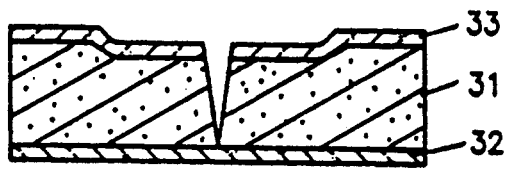
Figure 5D:
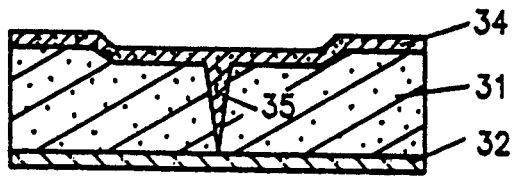
Figure 5E:
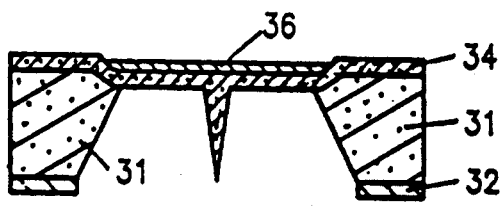
Figure 5F:
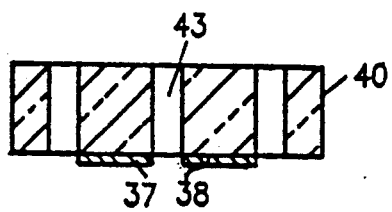

Referring to FIGS. 5A to 5G there is shown a first process comprising several steps for making an integrated scanning tunneling microscope using pneumatic and electrostatic control of tip motion in the Z-direction and electrostatic control of the X- and Y-scan of the tip. Fabrication starts with a substrate (31, FIG. 3A). Preferably this substrate is silicon or some other substrate material suitable for forming integrated electronic circuits. The first step in the fabrication sequence is to deposit silicon dioxide layers (32) on either side of the substrate (31). Silicon nitride layers can also be used. Next, a pit of several μm depth is wet- or dry-etched into a front silicon dioxide layer (32) and into substrate (31) using, for example, buffered hydrofluoric acid for silicon dioxide and 37.5 percent by weight aqueous KOH for a silicon substrate. The dimensions of the pit correspond to the future membrane size (say, 2 mm side length). The remaining silicon dioxide layer on the front side is then removed. The flat fine-etched pit is covered with a mask (33, FIG. 5B) which is resistant to substrate materials etchant. For example, silicon dioxide or aluminum can be used as mask materials. An opening is provided in masking layer (33) in the center of the pit, followed by etching a hole through the substrate (31, FIG. 5C). This etching step may be a dry-etching step using chlorine or bromine chemistry. The mask (33) is removed, and the front side including the deep hole is covered with a tensile stressed film (34). The film material, which preferably is silicon carbide or silicon nitride, may be deposited by plasma enhanced chemical vapor deposition. The film thickness may be, for example, 2 μm. The hole may have a diameter which is noticeably greater than 2 μm, depending upon the etch process, so that only the sidewalls and the bottom of the hole are covered with the film material. As a result, the future tip will be hollow, which may be advantageous for weight reasons (FIG. 5D).

Figure 5G:
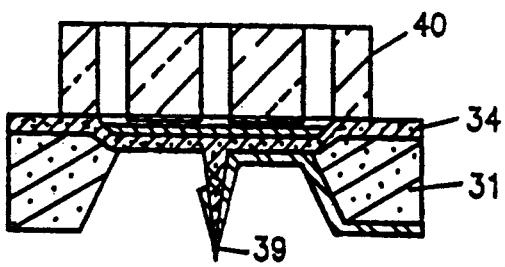
Figure 6A:
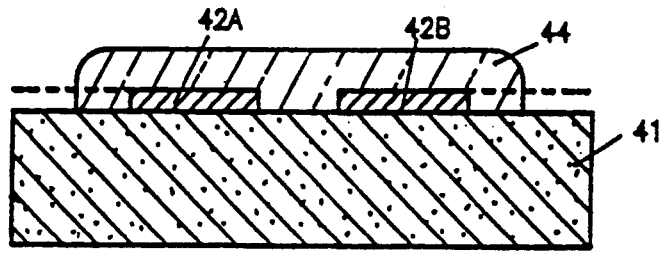
FIGS. 6A to 6E are cross sectional views of stages in a second preferred process of fabrication of a preferred structure for a scanning-tunneling-microscope sensor head according to the present invention.
Figure 6B:
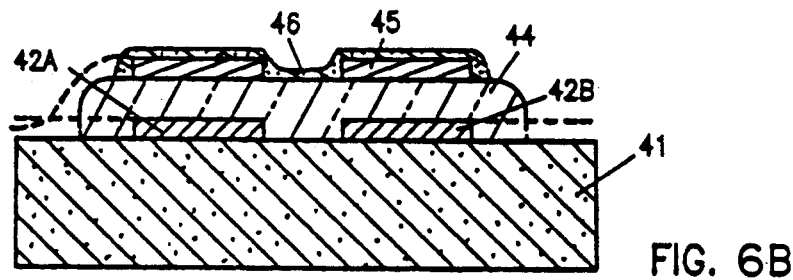
Figure 6C:
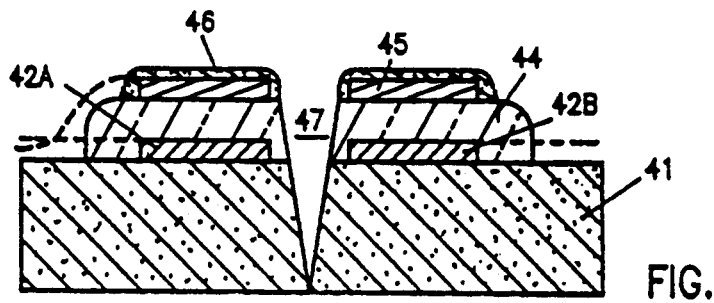
Figure 6D:
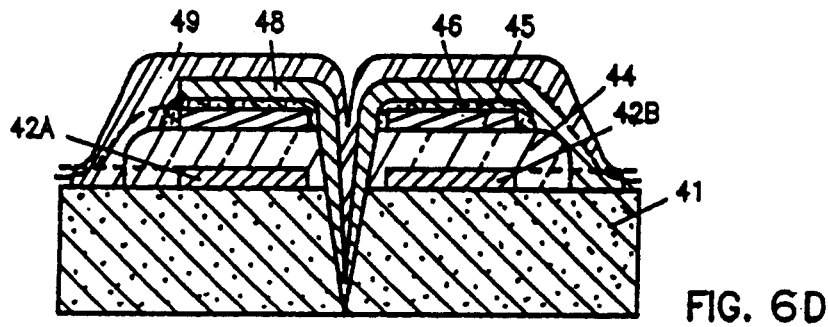
Figure 6E:
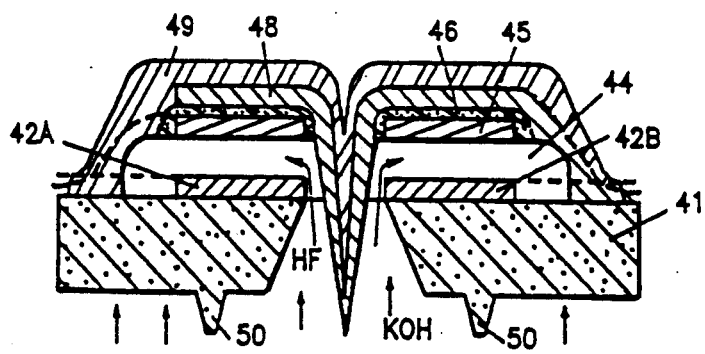

Next, the silicon dioxide mask (32) on the back side is opened, and the substrate (31) is thinned up by etching to the membrane (34) through the window thus obtained. A metallic electrode (36), consisting of Au or Al, is vapor-deposited on the front side of the membrane (34, FIG. 5E) using a molybdenum aperture mask. Two pairs of metallic electrodes X1, X2, Y1 and Y2 (37, 38) are formed on a glass block (40) by vapor deposition of Au or Al (FIG. 5F) using a molybdenum aperture mask. The dimensions of glass block (40) may be, for example, 3×3×2 mm. As previously mentioned, the glass block (40) is provided with bores (43) which allow a pneumatical coarse approach of tip (35) in Z direction. Preferably, the bores have a diameter of about 500 μm. Next, glass block (40) is bonded to the silicon frame (31, 34) with X, Y electrodes (37, 38) being positioned above Z electrode (36) on membrane (34) and membrane (34) with Z electrode being arranged on a lower plane. Bonding may be accomplished by "mallory" bonding effected at about 300° C. and 1000 V. (Mallory bonding is also referred to as anodic bonding or as field-assisted thermal bonding.) Proof of the bonding between glass block and substrate could be established by means of the SiC intermediate layer (FIG. 5G).

As up to this stage the tip (35) does not protrude from its surrounding silicon frame (31), the remaining silicon dioxide mask (32) on the back side is removed and the frame is thinned by etching. As the membrane material is an insulator, the tip (35) and a part of the membrane (34) and of silicon frame (31) on the bottom side have to be provided with an electrically conductive layer (39, FIG. 5G) to obtain voltage for the tunnel current. A preferred material for this layer is platinum which is applied with a thickness of about 0.1 μm.

The deep hole (FIG. 5C) whose imprint forms the future tip (35) may be produced to have a diameter of from about 20 to about 100 μm. In the event that problems occur during scanning as a result of this hole in a membrane under tension, the hole may be closed in part or in full. Preferably, the hole may be spanned with a tension-supporting lattice network, which can be made by the following steps. Following the silicon carbide or silicon nitride deposition step (34, FIG. 5D), the hole is filled with a polymeric material, preferably polyimide, and planarized. After a baking step at about 400° C., a second silicon carbide or silicon nitride layer is applied (not shown). This second silicon carbide or silicon nitride layer over the filled hole is partially opened in a reactive ion etching step, using a suitable mask such as a molybdenum mask with a lattice structure. In an oxygen plasma etching step, the polyimide is removed from the tip for weight reasons. This step yields a lattice spanning the hole, which does not allow a release of the membrane tension during scanning later on. It is thought however that given a reasonably small hole with a diameter of less than about 50 μm, such a supporting structure will not be required.

Referring to FIGS. 6A to 6E, there is shown a second process comprising a planar technology for making an integrated scanning tunneling microscope.

A layer of a conductive material, for example a 0.1 μm platinum layer, is applied to a substrate (41) by vapor deposition using a molybdenum aperture mask thereby obtaining four quadrants (42A, 42B, FIG. 6A) which are later on used as the lower electrodes for the X, Y and Z motion of the tip. The substrate is silicon or some other substrate material suitable for forming integrated electronic circuits. A silicon dioxide layer (44) is applied to the surface of the electrodes (42A, 42B) overlapping said electrodes, for example, by plasma enhanced chemical vapor deposition. This silicon dioxide layer with a thickness in the range of about 2 to about 5 μm serves as a spacer layer between the lower and upper electrodes and will be removed later on by selective etching to space the electrodes.

Next, an annular metal conductor (45), for example a platinum conductor about 0.1 μm thick, is applied to silicon dioxide layer (44) by vapor deposition using a molybdenum aperture mask. This annular metal conductor which covers approximately the same area as the lower electrodes (42A, 42B) forms a common counter-electrode for the four quadrant electrodes. A dielectric layer (46), say of silicon carbide or silicon nitride, is deposited on top of said annular metal conductor (45, FIG. 6B), for example, by plasma enhanced chemical vapor deposition. This material will essentially not be attacked during the etching of silicon dioxide layer (44) with buffered hydrofluoric acid.

A hole is provided in the center of the circular sandwich by reactive ion etching, followed by reactive ion etching of a tapered hole (47) through the silicon substrate (41), or of an inverted pyramid by anisotropic wet etching with for example approximately 37.5 percent by weight aqueous KOH. This hole which extends nearly through the entire silicon wafer (41) forms a negative of the future tip which will be filled with the tunnel contact material and which is separated from the lower electrodes. The sandwich including the deep hole is covered with the tunnel contact material may be (48), for example with a layer of platinum approximately 0.1 μm thick which may be deposited by vapor deposition using a molybdenum aperture mask. The tunnel current is fed through the conductor thus formed from the tip to the sample. To this conductor and to the entire structure, a dielectric layer (49) of silicon carbide or silicon nitride is applied, using for example plasma enhanced chemical vapor deposition. The thickness of this layer may be 2 μm. This layer represents the oscillating membrane (49) to which the upper electrode (45) is connected by dielectric layer (46) and conductor (48, FIG. 4D).

From the bottom side and by means of a structured oxide mask (not shown) the silicon surrounding the tip is removed, for example by etching with an aqueous solution of about approximately 37.5 percent by weight KOH. Subsequently, the whole wafer is slightly thinned around the 3 studs (50) using the same solution. By means of these studs the scanning tunneling microscope is positioned on the substrate to be investigated. The silicon dioxide layer (44) between the electrodes (42A, 42B and 45) is completely removed by etching with buffered hydrofluoric acid. This provides a clearance space for the membrane for moving along the X, Y and Z axes when electric fields are applied to the electrodes. The platinum-silicon carbide tip is connected to the membrane and can freely be moved by the same.

On top of the scanning tunneling microscope described with reference to FIGS. 6A to 6E a glass block may be arranged to allow pneumatical coarse approach of the membrane/tip assembly along Z-axis (not shown). A cavity is provided between the membrane (49) and the glass block to allow oscillation of the membrane. The glass block may be perforated for varying the damping of the membrane by subjecting the membrane to pressure, or, the cavity between the glass block and the membrane may be evacuated before bonding, with the bonding being used to obtain a vacuum-tight seal.

It is not intended to limit the present invention to the specific embodiments described above. It is recognized that changes may be made in the apparatus and methods specifically described herein without departing from the scope and teaching of the present invention, and it is intended to encompass all other embodiments, alternatives and modifications consistent with the invention.

We claim:

1. A scanning tunneling microscope comprising at least one electron-emitting tip maintained at an essentially constant distance along a Z-axis from a sample surface, an XY-drive for scanning said tip in a matrix fashion across said sample surface, means for controlling said tunnel current to maintain said distance essentially constant, characterized in that said XY-drive consists of at least four electrodes spaced from a counter-electrode;
    said four electrodes being upper electrodes arranged on a member, or lower electrodes arranged on substrate;
    said counter-electrode being connected to a membrane; and
    said electron-emitting tip being capable of moving along the Z-axis normal to the sample surface forming an integral part of said membrane.

2. The scanning tunneling microscope of claim 1, characterized in that said STM is fabricated by micromachining using integrated circuit processing steps.

3. The scanning tunneling microscope of claim 2, characterized in that said STM is fabricated by a planar batch technique.

4. The scanning tunneling microscope of claim 1, characterized in that said membrane consists of a dielectric material, and that said tip forming an integral part of said membrane is provided with an electrically conductive material and connected to individual electrodes to which voltage may be applied for moving said tip along the Z-axis normal to the sample surface.

5. The scanning tunneling microscope of claim 4, characterized in that said membrane consists of silicon carbide or silicon nitride, and said tip coating is platinum.

6. The scanning tunneling microscope of claim 1, characterized in that said member is a perforated glass block which forms part of a pressure or vacuum generating chamber.

7. The scanning tunneling microscope of claim 1, characterized in that for coarse approach of the membrane and integral tip along the Z-axis the pressure on said membrane is varied, and that for fine approach of the membrane and integral tip a voltage Uz is applied to a Z-electrode, the distance between tip and sample being controlled as a function of Uz.

8. The scanning tunneling microscope of claim 1, characterized in that the semiconductor substrate includes electronic devices for the current supply of the distance control of the tip and for processing the signals resulting from scanning.

9. A method of making a scanning tunneling microscope using pneumatic and electrostatic control of tip motion, comprising the following steps:
    a) depositing masking layers on either side of a semiconductor substrate; etching a pit of several μm depth into the front masking layer and into the substrate in a size which corresponds to the future membrane size;
    b) removing said front side masking layer; depositing a resistent masking layer on said etched pit;
    c) providing an opening in a layer in the center of said pit; etching a hole through the substrate;
    d) removing the remaining masking layer; and covering the front side of the substrate including said hole with a tensile stressed film;
    e) opening said back side masking layer; thinning down the substrate to expose the future membrane and tip; applying a metal layer to said tensile stressed film on the front side and patterning a first electrode so as to extend over said pit;
    f) applying a metal layer to a member and patterning second electrodes; and
    g) bonding said member with second electrodes to the substrate frame with the second electrodes being positioned above the first electrode on the membrane; and removing the remaining mask from the back side of substrate; thinning the substrate frame by etching; and applying a metal coating on the tip and a part of substrate.

10. The method of claim 9 wherein step a) of depositing masking layer comprises forming layers of silicon dioxide or silicon nitride on either side of a silicon substrate.

11. The method of claim 9 wherein step b) of depositing a resistent mask material comprises depositing silicon dioxide or aluminum.

12. The method of claim 9 wherein step d) of covering the front side of the substrate including said hole with a tensile stressed film comprises depositing silicon carbide or silicon nitride by plasma enhanced chemical vapor deposition.

13. The method of claim 9 wherein the etching steps of the masking layers comprise wet-etching steps using buffered hydrofluoric acid for silicon dioxide.

14. The method of claim 9 wherein the etching steps of the silicon substrate comprise wet-etching using an approximately 37.5 percent by weight aqueous KOH or dry-etching using chlorine or bromine chemistry.

15. The method of claim 9 wherein the depositing and patterning of first and second electrodes comprise vapor depositing a metal, using an aperture mask.

16. A method of making a scanning tunneling microscope using pneumatic and electrostatic control of tip motion, comprising the following steps:
 a) applying a metal layer to a substrate and patterning first electrodes; and applying a dielectric layer to the surface of electrodes overlapping said electrodes;
 b) applying a metal layer to said dielectric layer and patterning to form an annular conductor which covers approximately the same area as said first electrodes and forms the second electrode; depositing a dielectric layer on top of said annular conductor to form a generally circular sandwich;
 c) providing an opening in the center of the generally circular sandwich and etching a hole through the substrate;
 d) covering the circular sandwich including the hole with tunnel contact material; applying dielectric layer to the tunnel contact material layer and to the entire structure;
 e) removing the substrate material surrounding the tip by etching using a structured oxide mask; thinning the substrate by etching; and etching off the dielectric layer so as to provide clearance space for the sandwich, comprising the membrane, tunnel contact layer with a tip as an integral part of said layers, a dielectric layer, and an annular conductor, for moving along the X, Y, and Z-axes upon the application of electrical fields.

17. The method of claim 16 wherein step a) of depositing the dielectric layer comprises depositing silicon dioxide which acts as a spacer material and which is removed by etching with buffered hydrofluoric acid at a later stage.

18. The method of claim 16 wherein steps a, b, and d of depositing and patterning of first electrodes, of annular conductor, and of tunnel contact material comprise vapor depositing a metal, using an aperture mask.

19. The method of claim 16, wherein the step of depositing dielectric layer in steps b and d comprises depositing silicon carbide or silicon nitride by plasma enhanced chemical vapor deposition.

20. The method of claim 16 further comprising: providing a glass block on top of the scanning tunneling microscope, leaving a cavity between said glass block and the membrane to allow pneumatic coarse approach of the membrane/tip assembly along Z-axis normal to the sample surface.

* * * * *